United States Patent
Moore

(10) Patent No.: US 7,546,817 B2
(45) Date of Patent: Jun. 16, 2009

(54) ANIMAL CONTAINMENT TRANSMITTER SYSTEM

(75) Inventor: William P. Moore, Fort Wayne, IN (US)

(73) Assignee: Radio Systems Corporation, Knoxville, TN (US)

( * ) Notice: Subject to any disclaimer, the term of this patent is extended or adjusted under 35 U.S.C. 154(b) by 233 days.

(21) Appl. No.: 11/490,743

(22) Filed: Jul. 21, 2006

(65) Prior Publication Data

US 2008/0017133 A1    Jan. 24, 2008

(51) Int. Cl.
*A01K 15/02* (2006.01)
(52) U.S. Cl. .................... 119/721; 119/720; 340/573.3
(58) Field of Classification Search ................. 119/721, 119/859, 908, 720; 340/573.3
See application file for complete search history.

(56) References Cited

U.S. PATENT DOCUMENTS

| | | | |
|---|---|---|---|
| 4,445,784 A * | 5/1984 | Shida et al. ................. 368/157 |
| 5,272,466 A * | 12/1993 | Venczel .................... 340/573.3 |
| 5,602,462 A | 2/1997 | Stich et al. .................. 323/258 |
| 5,680,238 A | 10/1997 | Masuda ...................... 359/132 |
| 6,021,052 A | 2/2000 | Unger et al. .................. 363/26 |
| 6,066,976 A | 5/2000 | Cho ............................ 327/350 |
| 6,107,786 A | 8/2000 | Brown ........................ 323/224 |
| 6,160,449 A | 12/2000 | Klomsdorf et al. .......... 330/149 |
| 6,166,598 A | 12/2000 | Schlueter .................... 330/127 |
| 6,172,541 B1 | 1/2001 | Young et al. ................ 327/170 |
| 6,518,808 B2 | 2/2003 | Shimoda ..................... 327/172 |
| 6,650,174 B2 | 11/2003 | Bell ............................ 327/540 |
| 6,836,650 B2 | 12/2004 | Sorrells et al. .............. 455/319 |
| 2006/0037560 A1* | 2/2006 | So ............................. 119/721 |

* cited by examiner

*Primary Examiner*—Rob Swiatek
(74) *Attorney, Agent, or Firm*—Pitts & Brittian, P.C.

(57) ABSTRACT

A signal transmitter system for an animal training system including an electrical impedance loop, a signal generator and a power supply. The signal generator is connected to the electrical impedance loop. The signal generator provides a current signal to the electrical impedance loop. The power supply provides a voltage level to the signal generator. The voltage level is dependent upon a measured characteristic of a voltage signal that results from an interaction of the current signal with the electrical impedance loop.

14 Claims, 2 Drawing Sheets

ANIMAL CONTAINMENT TRANSMITTER SYSTEM

BACKGROUND OF THE INVENTION

1. Field of the Invention

The present invention relates to a signal transmitter system, and, more particularly, to a signal transmitter system for an animal containment system.

2. Description of the Related Art

Conventional and electrical fencing is commonly used to control the location of animals. Barrier fencing, which physically blocks the movement of the animal, is frequently used to confine both domestic pets and farm animals. Physical electrical fencing, which uses an electrical shock to discourage contact with the fence, is typically used to confine commercial livestock. The purpose of an electric fence is to keep farm animals within an area, or to prevent undesired animals from entering the property. High voltage electrical impulses are applied to the fence wire by an energizer. This impulse lasts only thousandths of a second but is repeated every second or so. An animal, which strays into contact with the wire, completes the circuit between the live wire and the soil. The result is an electrical shock sufficiently unpleasant to cause the animal to move rapidly away from the fence before the next electrical impulse. After a few encounters, animals learn not to touch the live wire or approach the fence too closely.

Electronic animal control systems are known in which a radio frequency receiver collar is attached to the animal to limit the movement of the animal to a predetermined area of confinement. The predetermined area is configured through the physical arrangement of a subterranean transmission antenna, which transmits a unique electromagnetic signal produced by an operably linked transmitting device. The transmission pattern of the subterranean antenna creates zones of transmission or area boundaries in which the attached animal receiver collar is responsive to the uniquely transmitted electromagnetic signal. Upon entering a predetermined limit area, the receiver collar detects the unique electromagnetic signal and in response, delivers a correction stimulus, such as a mild shock or audible signal to the animal. The effect of the repeated stimulus teaches the animal, such as a dog, to avoid the limit area thus confining the animal without use of physical fences or barriers.

The signal transmitters that send the signal through the subterranean antenna are sufficiently sized to power the antenna regardless of the geometry or the length of the antenna that is installed for the confinement of the animal. This leads to inefficient production of the unique electromagnetic signal.

What is needed in the art is an efficient adaptive transmitter system.

SUMMARY OF THE INVENTION

The present invention provides a signal transmitter system that adapts to the impedance load of the subterranean antenna.

The invention comprises, in one form thereof, a signal transmitter system for an animal training system including an electrical impedance loop, a signal generator and a power supply. The signal generator is connected to the electrical impedance loop. The signal generator provides a current signal to the electrical impedance loop. The power supply provides a voltage level to the signal generator. The voltage level is dependent upon a measured characteristic of a voltage signal that results from an interaction of the current signal with the electrical impedance loop.

An advantage of the present invention is that the transmitter system produces less heat than a conventional system.

Another advantage of the present invention is that an adjustable level of power is supplied to the signal generator to better match the signal generator to the attached impedance loop.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
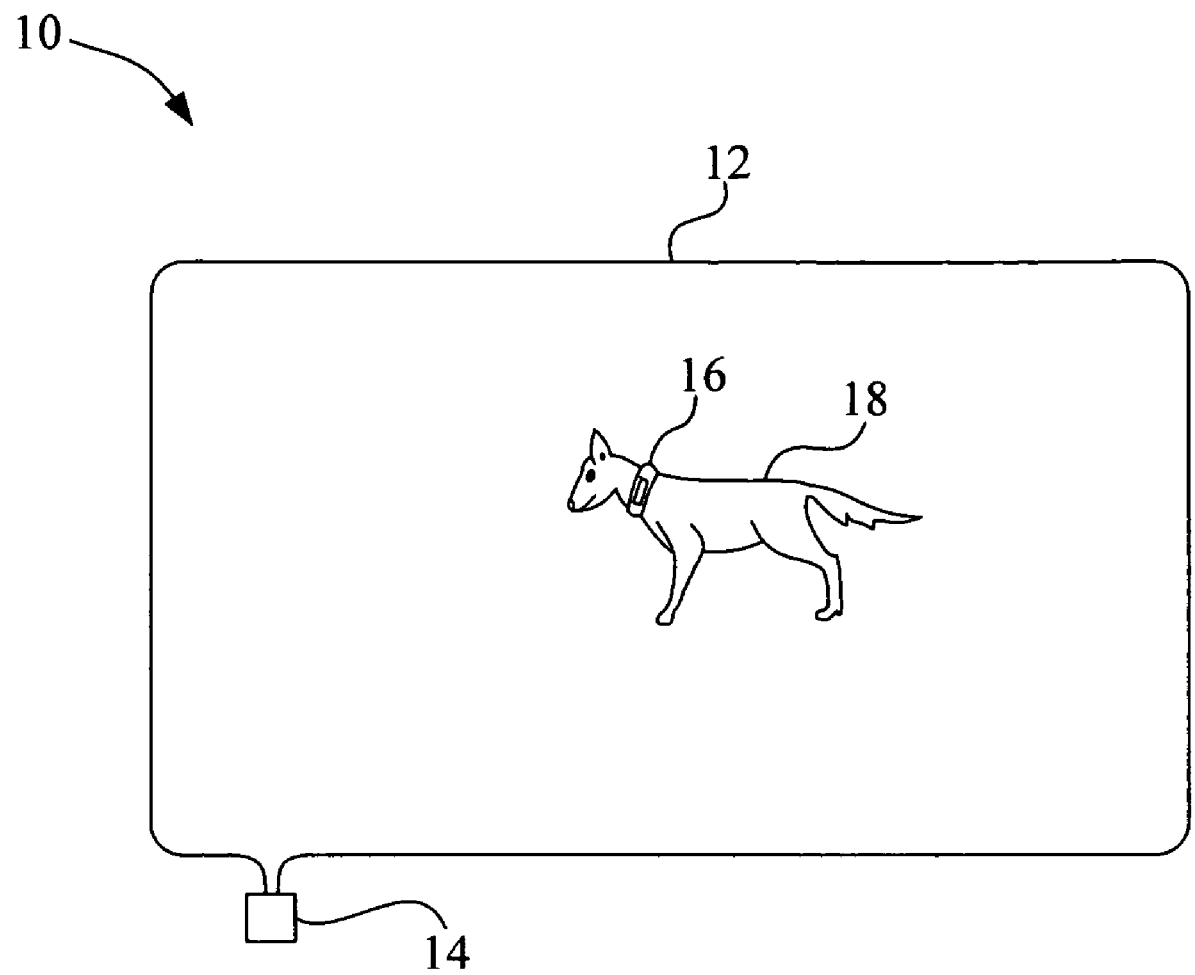
FIG. 1 is a schematical representation of a confinement system utilizing transmitter system of the present invention.

Referring now to the drawings, and more particularly to FIG. 1, there is shown a signal transmitter system 10 including an impedance loop 12 and a signal transmitter 14. Signal transmitter 14 interacts with receiver collar 16 that is positioned around the neck of dog 18. If dog 18 approaches a boundary defined by the location of impedance loop 12 a signal that is being transmitted over impedance loop 12 is detected by receiver collar 16 causing a corrective stimulus to be applied to dog 18, to thereby confine dog 18 in the area defined by the geometry of impedance loop 12. Signal transmitter 14 sends a unique current signal through impedance loop 12, which is hereinafter referred to as a current signal. It is known that a current signal sent through an inductive component creates a voltage signal as a result of the interaction of the current signal with the inductance of the inductive component, such as impedance loop 12.

Since impedance loop 12 can conceivably be any type and form of planar geometrical layout for the confinement of dog 18 the length and shape of impedance loop 12 is not known by the manufacturer and is uniquely laid out to meet the animal owner's animal confinement needs. The present invention adapts to the impedance encountered by signal transmitter 14 by altering power supplied to the signal generator to more accurately tailor the power consumption of 10 transmitter 14 to that needed to send the unique current signal through impedance loop 12.

Figure 2:
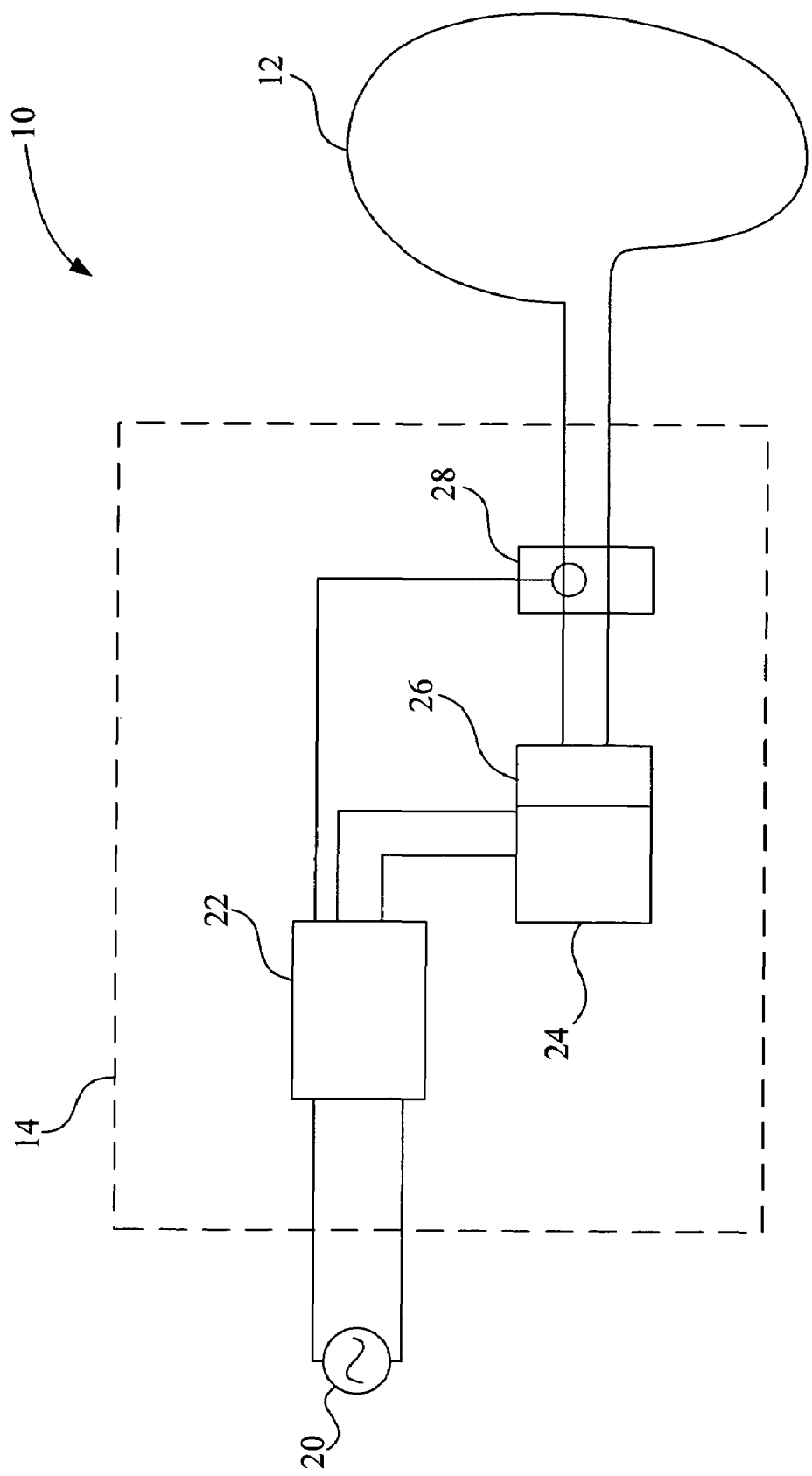
FIG. 2 is a schematical representation of elements of transmitter system of FIG. 1.

Now, additionally referring to FIG. 2 there is shown transmitter 14 powered by a power source 20. Signal transmitter 14 includes a power supply 22, a signal generator 24, an amplifier 26 and a sensor 28. Power supply 22 receives power from power source 20 and converts it into DC power that is supplied to signal generator 24 and amplifier 26. Signal generator 24 includes circuitry to create the unique current signal that is to be sent into impedance loop 12. The signal created in signal generator 24 is amplified by amplifier 26, which sends the current signal into impedance loop 12. When amplifier 26 is driving the current signal at a predetermined frequency through impedance loop 12 it may require a relatively high power supply voltage to accomplish this. Controlling circuitry contained in power supply 22 utilizes information from sensor 28 from the reflected voltage signal caused by the current signal being sent through impedance loop 12 to determine if the voltage level from power supply 22 should be altered as it is supplied to signal generator 24 and/or amplifier 26. For example, a microprocessor may be utilized to monitor the slew or signal clipping that is detected in the voltage signal sensed by sensor 28. The microprocessor will periodically take a burst of samples of the analog waveform representative of the voltage signal detected by a sensor 28. If there is a high slew rate or if there is more than a certain number of samples with less than a predetermined amount of change, which is known as signal clipping, the voltage from power supply 22 is increased to reduce or eliminate the clipping. The detection of a high slew rate indicates that more power is needed to properly send the correct current signal through impedance loop 12. If the slew rate is lower than a predetermined amount then the power supply voltage is decreased, thereby reducing the power dissipated in signal generator 24 and/or amplifier 26.

Although the peak voltage levels of the voltage signal could be measured in order to detect the needed power supply adjustment, it has been found that impedance loop 12 may pick up other signals and distort the peak values of the voltage signal that would be detected by sensor 28. With this in mind the present invention relies upon the rate of change of the voltage signal, also known as the slew rate to determine if the voltage level being supplied by power supply 22 should be adjusted. The slew rate measurements may be averaged over a predetermined period of time, such as ten seconds, to prevent any oscillations that would occur if the reaction time was too fast.

The adjustment of voltage from power supply 22 may consist of multiple levels that are selected by the microprocessor based upon the slew rates detected in the information from sensor 28. Alternatively, the voltage adjustment of power supply 22 may be a continuous adjustment between a predetermined high voltage and a minimum voltage.

To understand the slew rate detection method of the present invention a sinusoidal waveform can be envisioned for the sampling of the voltage. The signal slew rate is of course dependent upon the portions of the signal being measured. If the voltage signal is being clipped then several samples will show minimal changes in the voltage level caused by the clipping. If the slew rate is high during the signal crossing of zero volts, then the voltage signal peak will be high. Conversely, if the slew rate is low during the signal crossing of zero volts, then the voltage signal peak is lower. This correspondence of the slew rate of the signal with the anticipated peak value is used in the present invention to adjust the voltage supplied to the signal generator/amplifier.

The present invention advantageously reduces the amount of power utilized by the transmitter system, which increases the reliability and longevity of the transmitter system while saving energy. Another advantage of the present system is that the uniform current signal can be efficiently produced, which is then less dependent upon the geometry and length of impedance loop 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal training system, comprising:
   a signal receiver; and
   a signal transmitter system sending a signal to said signal receiver, said signal transmitter system including:
      an electrical impedance loop;
      a signal generator connected to said electrical impedance loop, said signal generator providing a current signal to said electrical impedance loop; and
      a power supply providing a voltage level to said signal generator, said voltage level being dependent upon a measured characteristic of a voltage signal that results from an interaction of said current signal with said electrical impedance loop.

2. The animal training system of claim 1, wherein said measured characteristic is a slew rate of said voltage signal.

3. The animal training system of claim 2, wherein said voltage level is increased if said slew rate is above a predetermined value.

4. The animal training system of claim 2, wherein said voltage level is decreased if said slew rate is below a predetermined level.

5. The animal training system of claim 1, wherein said measured characteristic is a clipping of said voltage signal.

6. The animal training system of claim 5, wherein said voltage level is increased if said clipping is detected.

7. The animal training system of claim 1, wherein said signal generator includes an amplifier for which said voltage level is dependent upon said measured characteristic.

8. A signal transmitter system for an animal training system, comprising:
   an electrical impedance loop;
   a signal generator connected to said electrical impedance loop, said signal generator providing a current signal to said electrical impedance loop; and
   a power supply providing a voltage level to said signal generator, said voltage level being dependent upon a measured characteristic of a voltage signal that results from an interaction of said current signal with said electrical impedance loop.

9. The signal transmitter system of claim 8, wherein said measured characteristic is a slew rate of said voltage signal.

10. The signal transmitter system of claim 9, wherein said voltage level is increased if said slew rate is above a predetermined value.

11. The signal transmitter system of claim 9, wherein said voltage level is decreased if said slew rate is below a predetermined level.

12. The signal transmitter system of claim 8, wherein said measured characteristic is a clipping of said voltage signal.

13. The signal transmitter system of claim 12, wherein said voltage level is increased if said clipping is detected.

14. The signal transmitter system of claim 8, wherein said signal generator includes an amplifier for which said voltage level is dependent upon said measured characteristic.

* * * * *